July 10, 1951          N. A. BOTTOME          2,560,080

SET SCREW WITH KEY EXTENSION

Filed Dec. 21, 1945

INVENTOR
Nelson A. Bottome
BY

ATTORNEYS

Patented July 10, 1951

2,560,080

UNITED STATES PATENT OFFICE 2,560,080

SET SCREW WITH KEY EXTENSION

Nelson A. Bottome, Bridgeport, Conn.

Application December 21, 1945, Serial No. 636,372

6 Claims. (Cl. 85—1)

This invention relates to a set screw with key extension for securing gears, wheels, pulleys and the like to shafts, and has for an object to provide an improved and simplified fastening device for this purpose which may be used to either rigidly secure the gear, wheel, pulley or the like to the shaft or to permit their sliding on the shaft either longitudinally, or at right angles by turning movement around the shaft, depending on the direction in which the keyway or channel is cut in the shaft.

Another object is to provide a fastening device of this character which makes it unnecessary to machine keyways or channels in the hubs of gears, wheels, pulleys and the like which are to be secured to a shaft, and also eliminating the use of the usual key or set screw.

Another object is to provide a device in which the function of a key and a set screw is combined into a unit.

Another object is to provide an improved construction whereby the safety features of a headless socket screw is secured.

Another object is to provide a construction in which the key member is mounted in a socket type screw in such a way as to be automatically centered therein, and may be rotated by means of a simple standard type tool to properly align it with the keyway in the shaft.

A still further object is to provide a device of this character in which the key portion may be rigidly clamped or set in the keyway to prevent relative movement between the hub and the shaft, or it may be set and locked in position to permit relative movement between the hub and the shaft, as for example where it is desired to spline the gear, pulley and the like on the shaft.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
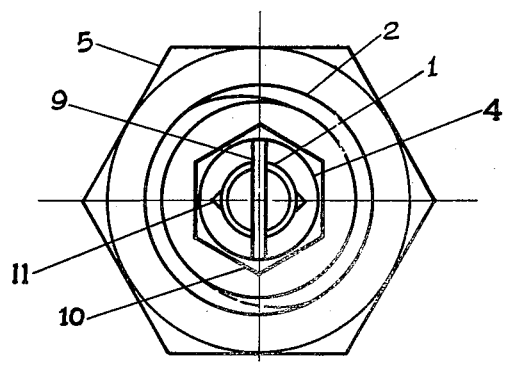
Fig. 1 is a top plan view of the device removed from the hub in which it is used.
Figure 2:
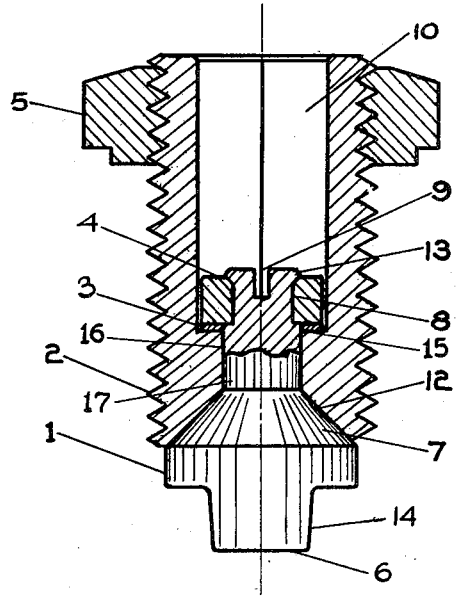
Fig. 2 is a partial longitudinal section of the device showing the inner portions of the binding member.
Figure 3:
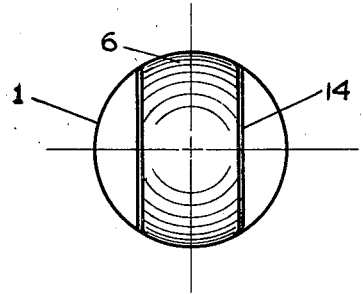
Fig. 3 is a lower or inner end view.

The device as illustrated comprises a binding member 1 mounted to turn in a body or supporting member 2, which body member comprises a safety hollow socket type screw threaded on its outer walls for insertion in a threaded or tapped opening in the hub of the wheel, pulley or the like with which it is to be used, this member being provided with a noncircular socket 10 extending inwardly from its upper or outer end. This may be the usual hexagonal or other desired shape socket to receive a similarly shaped tool for turning the screw for inserting it in and removing it from the hub. At its inner end the socket is provided with a shoulder 15 and at its inner end the screw is provided with a tapered socket 12 and a passage 16 leading from the inner end of this socket through the shoulder.

The binding member 1 comprises an intermediate tapered portion 7 having a similar taper to that of the socket 12 and seated in this socket, and leading from this tapered portion is a cylindrical or neck portion 17 in the passage 16 and provided with a reduced upper end portion 8 to receive a retaining collar 4. The upper end of the reduced portion 8 is swaged over the collar 4, as indicated at 13, to retain it in position, and in order to prevent turning of the collar on the stem 7 it may be provided with notches 11 in its upper end into which part of the metal of the stem is forced in the swaging operation to effectively lock the collar to the stem. The inner end of the stem and the collar are provided with some means to receive a tool for turning the binding member 1 relative to the screw 2 to properly position it. In the present case they are provided with a transverse slot 9 adapted to receive the bit of a screw driver. At its other end the binding member 1 is provided with a key portion 6 flattened on its opposite sides 14 so as to seat in a keyway in the shaft, and the sides 14 are preferably slightly tapered, as indicated, so that the key will tightly fit and bind in the keyway if desired, where the hub is held stationary relative to the shaft, but to compensate for wear where the hub is splined to the shaft or is mounted for relative motion with respect to it. It is preferred to provide an antifriction bearing washer 3 between the retaining collar 4 and the shoulder 15, making a properly working swivel bearing.

The device may or may not be provided with a locking or positioning nut 5 threaded onto the body member or screw 2. This may be used either as a positioning nut or as a locking nut. That is, when the screw 2 is set up and properly positioned with the key 6 in the keyway in the shaft, the whole device may be locked in this position by setting up the nut 5 with its inner or lower wall 5a tight against the outer surface of the hub in which the device is mounted, or where the device is used as a spline to permit relative movement between the hub and the shaft, the screw 2 is set to provide the proper clearance between the key 6 and the keyway and the device is locked in this position to maintain the relative position of the key in the keyway by setting up the nut 5 against the surface of the hub.

It will be clear from the above that this provides a novel and simple construction of securing device for securing the hubs of wheels, gears, pulleys, cams, drums, or the like, to a shaft, and for positioning and locating of the hub of these elements with respect to the shaft.

It will be understood one or more of these fasteners may be used in the hub as desired or found necessary; that because of the adjustable feature and the means for locking the key in adjusted positions, the device may be used for compensating for wear in the keyway of the shaft and always maintaining the proper relation between the key and the keyway. It eliminates the cost of machining the keyway in the hub, and because it comprises the safety socket type screw it eliminates projecting heads of set screws and the like which are always a dangerous feature. The tapered mounting 12 for the key automatically centers the key in the body or socket member, and it also provides adequate bearing to permit swivelling of the key in the socket member 2 for proper aligning of the key with respect to the keyway. This device may have the function of both the key and the set screw combined in one unit, or it may be used as either one of these devices.

Having thus set forth the nature of my invention, I claim:

1. A fastening device of the character described comprising an exteriorly threaded body member for insertion in a threaded hole in the hub of a pulley wheel or the like and provided with a non-circular socket extending inwardly from its outer end to receive a similarly shaped wrench, said body member being also provided with a tapered socket in its inner end and a passage leading from said socket to the first socket and smaller than the first socket to provide a shoulder at the bottom of the first socket, a binding member including a similarly tapered intermediate portion mounted in the tapered socket and provided with an extension forming a key beyond the end of the body member provided with flattened side walls to extend into a keyway in a shaft in the hub, said binding member including a cylindrical portion in the passage provided with a reduced inner end portion above the shoulder, a retaining collar mounted on said reduced end portion and cooperating with the shoulder to retain the binding member in the body member, the end of the reduced portion being swaged over the collar, and said binding member being provided with a slot in its inner end to receive a tool for turning the binding member for lining up its flattened extension with the keyway.

2. A fastening device of the character described comprising a hollow socket type screw member for insertion in a threaded hole in the hub of a pulley wheel or the like, the socket being non-circular to receive a similarly shaped tool and provided with a shoulder at its inner end, said screw being provided with a tapered socket in its inner end and a passage from said tapered socket surrounded by the shoulder, a binding member including a similarly tapered body portion seated in the tapered socket and provided with a key extension provided with flattened side walls to seat in a keyway in a shaft in the hub, said binding member also including an extension in said passage, a retaining collar on said latter extension above the shoulder and cooperating therewith to retain the binding member for turning movement in the socket, the end of the extension being swaged over the collar to retain it thereon, and noncircular means on said extension to cooperate with a similarly shaped tool to turn the binding member to align the flattened key with the keyway.

3. A fastening device of the character described comprising a hollow socket type screw member for insertion in a threaded hole in the hub of a pulley wheel or the like, the socket being non-circular to receive a similarly shaped tool and provided with a shoulder at its inner end, said screw being provided with a tapered socket in its inner end and a passage from said tapered socket surrounded by the shoulder, a binding member including a similarly tapered body portion seated in the tapered socket and provided with a key extension provided with flattened side walls to seat in a keyway in a shaft in the hub, said binding member also including an extension from the smaller end of the tapered portion mounted in the passage and provided with a reduced upper end portion in the first socket above the shoulder, a retaining collar on said reduced portion over the shoulder and the end of the reduced portion being swaged over the collar to retain it thereon, noncircular means in said extension to cooperate with a similarly shaped tool to turn the binding member in the socket screw, and a bearing washer between the collar and the shoulder at the bottom of the first socket.

4. A fastening device of the character described comprising a hollow socket type screw member for insertion in a threaded hole in the hub of a pulley wheel or the like, the socket being non-circular to receive a similarly shaped tool and provided with a shoulder at its inner end, said screw being provided with a tapered socket in its inner end and a passage from said tapered socket surrounded by the shoulder, a binding member including a similarly tapered body portion seated in the tapered socket and provided with a flattened tapered key extension at its inner end to seat in a keyway in a shaft on which the hub is mounted, said binding member also including an extension at its other end mounted in the passage and provided with a reduced end portion in the first socket, a retaining collar on said reduced portion above the shoulder provided with one or more notches in its outer end, the end of the reduced portion being swaged over the collar and into the notches to retain the collar on the extension, and said extension and collar being provided with a transverse slot to receive a screw driver bit for turning the binding member in the socket screw.

5. A fastening device of the character described comprising a hollow socket type externally threaded screw member for insertion in a threaded hole in the hub of a pulley wheel or the like, the socket being non-circular to receive a similarly shaped tool and provided with a shoulder at its inner end, said screw being provided with a tapered socket in its inner end and a passage from said tapered socket surrounded by the shoulder, a binding member including a similarly tapered body portion seated in the tapered socket and provided with a key extension having flattened side walls at its inner end to seat in a keyway in a shaft on which the hub is mounted, said binding member also including an extension at its other end mounted in the passage and having a reduced end portion in the first socket, a retaining collar on said reduced portion cooperating with the shoulder to retain the binding member in the socket screw, the end of the reduced portion being swaged over the collar to retain it on said portion, non-circular means on the reduced end portion to cooperate with a similarly shaped tool to turn the binding member to align the key extension with the keyway, and a positioning and locking nut threaded on the outside of the socket screw adapted to be set against the surface of the hub to position the screw and lock it in position.

6. A fastening device of the character described comprising a hollow socket type screw member for insertion in a threaded hole in the hub of a pulley wheel or the like, the socket being non-circular to receive a similarly shaped tool and provided with a shoulder at its inner end, said screw being provided with a tapered socket in its inner end and a cylindrical passage from said tapered socket surrounded by the shoulder, a binding member including a similarly tapered body portion seated in the tapered socket and provided with a flattened tapered key extension at its inner end to seat in a keyway in a shaft on which the hub is mounted, said binding member also including a cylindrical extension at its other end mounted in the passage and provided with a reduced end portion in the first socket above the shoulder, a retaining collar on said reduced portion above the shoulder, the end of said reduced portion being swaged over the collar to retain it on this portion, and said extension and collar being provided with a transverse slot to receive a screw driver bit for turning the binding member in the socket screw.

NELSON A. BOTTOME.

REFERENCES CITED

The following references are of record in the file of this patent:

UNITED STATES PATENTS

| Number | Name | Date |
| --- | --- | --- |
| 1,346,867 | Weibell | July 20, 1920 |
| 1,438,648 | Jacobs | Dec. 12, 1922 |
| 1,815,518 | Luers | July 21, 1931 |
| 1,910,994 | Joyce | May 23, 1933 |
| 2,354,160 | Wallgren | July 18, 1944 |
| 2,355,899 | Beede | Aug. 15, 1944 |
| 2,355,900 | Beede | Aug. 15, 1944 |

FOREIGN PATENTS

| Number | Country | Date |
| --- | --- | --- |
| 173,712 | Great Britain | Jan. 12, 1923 |
| 204,581 | Switzerland | May 15, 1939 |